US011627217B2

(12) United States Patent
Bodiga et al.

(10) Patent No.: US 11,627,217 B2
(45) Date of Patent: Apr. 11, 2023

(54) MACHINE INTELLIGENT ISOLATION OF INTERNATIONAL CALLING PERFORMANCE DEGRADATION

(71) Applicant: T-Mobile USA, Inc., Bellevue, WA (US)

(72) Inventors: Prem Kumar Bodiga, Bothell, WA (US); Hermie Padua, Marysville, WA (US); Ariz Jacinto, Bellevue, WA (US); Feng Liu, Frisco, TX (US); Joseph Park, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/725,470

(22) Filed: Apr. 20, 2022

(65) Prior Publication Data

US 2022/0247858 A1    Aug. 4, 2022

Related U.S. Application Data

(63) Continuation of application No. 17/163,079, filed on Jan. 29, 2021, now Pat. No. 11,343,373.

(51) Int. Cl.
*H04M 3/36* (2006.01)
*G06N 20/00* (2019.01)
*G06F 16/28* (2019.01)

(52) U.S. Cl.
CPC ............ *H04M 3/36* (2013.01); *G06F 16/285* (2019.01); *G06N 20/00* (2019.01)

(58) Field of Classification Search
CPC ......... H04M 3/36; G06F 16/285; G06N 20/00
USPC ..................................................... 379/220.01
See application file for complete search history.

(56) References Cited

U.S. PATENT DOCUMENTS

| | | |
|---|---|---|
| 7,020,130 B2 | 3/2006 | Krause et al. |
| 7,440,778 B2 | 10/2008 | Pearce |
| 7,593,904 B1 | 9/2009 | Kirshenbaum et al. |
| 7,702,532 B2 | 4/2010 | Vigil |
| 7,751,325 B2 | 7/2010 | Krishnamurthy et al. |
| 7,929,512 B2 | 4/2011 | Malomsoky et al. |
| 8,205,259 B2 | 6/2012 | Stute |
| 8,332,256 B2 | 12/2012 | Dey et al. |
| 9,026,644 B2 | 5/2015 | Parker et al. |
| 9,119,086 B1 | 8/2015 | Ouyang et al. |
| 9,277,431 B1 | 3/2016 | Podolsky |

(Continued)

*Primary Examiner* — Binh Kien Tieu
(74) *Attorney, Agent, or Firm* — Perkins Coie LLP

(57) ABSTRACT

The disclosed system identifies international calling performance issues of a wireless telecommunication network. The system receives network traffic data for international calls including information about call attempts to a country. The system categorizes the country into a major category and a minor category based on the call attempts information. For a subset of countries, and for each key performance indicator in a subset of selected key performance indicators, the system monitors performance using an anomaly detection model to identify an anomaly in network performance, determines an actual value of the key performance indicator for the detected anomaly, and computes a variation value of the determined actual value based on a predicted range of values. The system ranks countries using the computed variation values, to indicate problematic parts of the wireless telecommunication network.

19 Claims, 7 Drawing Sheets

(56) References Cited

U.S. PATENT DOCUMENTS

| | | | |
|---|---|---|---|
| 10,091,679 B1 | 10/2018 | Munar et al. | |
| 10,164,850 B2 | 12/2018 | Tapia et al. | |
| 10,397,810 B2 | 8/2019 | Yang et al. | |
| 10,609,587 B2 | 3/2020 | Livschitz et al. | |
| 11,343,373 B1 * | 5/2022 | Bodiga | H04M 3/36 |
| 11,510,047 B2 * | 11/2022 | Koshy | H04W 52/367 |
| 11,522,766 B2 * | 12/2022 | Boussac | G06N 20/00 |
| 2002/0123333 A1 | 9/2002 | Sato | |
| 2004/0213150 A1 | 10/2004 | Krause et al. | |
| 2005/0044406 A1 | 2/2005 | Stute | |
| 2007/0036309 A1 | 2/2007 | Zoldi et al. | |
| 2010/0123575 A1 | 5/2010 | Mittal et al. | |
| 2011/0173051 A1 | 7/2011 | Dey et al. | |
| 2011/0258702 A1 | 10/2011 | Olney et al. | |
| 2012/0233311 A1 | 9/2012 | Parker et al. | |
| 2016/0344606 A1 | 11/2016 | Baccarani | |
| 2017/0201897 A1 | 7/2017 | Yang et al. | |
| 2017/0293515 A1 * | 10/2017 | Brew | G06F 17/18 |
| 2017/0318555 A1 | 11/2017 | Libschitz et al. | |
| 2018/0006957 A1 | 1/2018 | Ouyang et al. | |
| 2018/0084107 A1 | 3/2018 | Aggarwal et al. | |
| 2018/0270678 A1 | 9/2018 | Munar et al. | |
| 2019/0104427 A1 | 4/2019 | Munar et al. | |
| 2019/0132757 A1 | 5/2019 | Tapia et al. | |
| 2020/0092159 A1 | 3/2020 | Thampy et al. | |
| 2020/0177611 A1 | 6/2020 | Bharrat et al. | |
| 2021/0392007 A1 * | 12/2021 | Ghosh | H04L 61/2542 |

* cited by examiner

*FIG. 2C*

MACHINE INTELLIGENT ISOLATION OF INTERNATIONAL CALLING PERFORMANCE DEGRADATION

CROSS-REFERENCE TO RELATED APPLICATION

This application is a continuation of U.S. patent application Ser. No. 17/163,079, filed Jan. 29, 2021, entitled MACHINE INTELLIGENT ISOLATION OF INTERNATIONAL CALLING PERFORMANCE DEGRADATION, which is hereby incorporated by reference in its entirety.

BACKGROUND

International telephone calls are made between different countries. A United States telecommunication network operator can place an international call to over 200 different countries or destinations. These telephone calls are processed by international gateway exchanges (switches). A single US telecommunication network operator can use multiple carriers (e.g., over 10 carriers) for international calls. Each of the over 200 countries can have a combination of 10 or more international call carriers. A single call can be routed among multiple international carriers. The international carriers supporting calls to various countries can change daily. Therefore, determining and isolating issues in international calls is quite complicated due to a large number of destinations and a large number of carriers involved in the calls.

BRIEF DESCRIPTION OF THE DRAWINGS

FIG. 2C shows a ranking of inbound call attempts.

DETAILED DESCRIPTION

Troubleshooting and resolving the issues faced by a user of the wireless telecommunication network, especially when involved in international communications, can be complicated. International communication can include international calls, international texts, or other communication conducted at least partly over a wireless telecommunication network. The flow of troubleshooting the international calling performance degradation involves analyzing various signatures created by the network when a call is being placed. The method and system presented here accelerate the troubleshooting and issue resolution time by providing the engineers with a concrete summary of their use-case that leads them to the root cause analysis and eventually a step closer to the next best action. A hardware or software processor associated with the method and system presented here implements a ranking algorithm that provides a ranked list of the most important issues faced by a user involved in international communication.

Disclosed systems and methods efficiently troubleshoot and resolve network performance issues related to international long-distance calling, text messages, data communications, etc., over a wireless telecommunication network. The method utilizes domain-specific, weight-based ranking on anomalous data to isolate the performance degradation of international calling service. This can help provide engineers guidance on identifying where issues with international long-distance calling arise so that the issues can be resolved in a timely and efficient fashion, oftentimes even before the issue is escalated by a user. The method categorizes international markets (e.g., countries) into a major category and a minor category based on the number of call attempts. Then, for each unique combination of a country and a key performance indicator (KPI), the method monitors the performance using a previously patented anomaly detection model. The method then analyzes the output of the model to compute percentage deviations of an actual measured value from a predicted range. Then, based on the specific nature of the KPI, the method classifies the detected anomalies into various grades (e.g., good or bad). The method computes a weighted ranking of the countries based on the detected anomalies. The weighted ranking is then used to identify insights into each of the categories to provide specific guidance on where to focus for troubleshooting as well as network design.

Figure 1A:
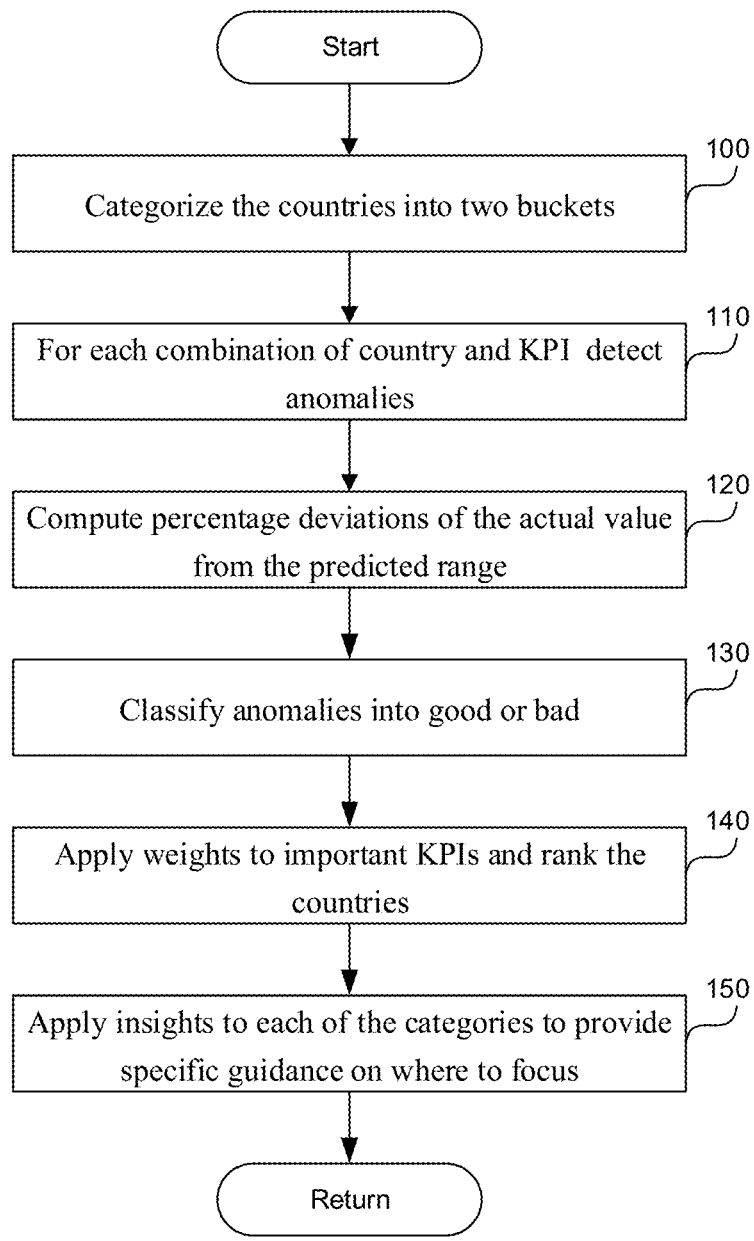
FIG. 1A is a flowchart of a method to identify international communication performance issues, according to some embodiments.

FIG. 1A is a flowchart of a method to identify international communication performance issues, according to some embodiments.

In block 100, a processor categorizes international countries into multiple buckets, such as major and minor, based on the number of call attempts made to each country. For example, the processor categorizes a country receiving more than 5,000 call attempts per day as a major country, and a country receiving 5,000 or less call attempts per day as a minor country. Categories can change based on type of scenarios that are handled. Besides the above-described category based on the call attempt patterns, other categories can include realm name and/or carrier level categories based on count of globally served countries etc.

In block 110, the processor detects anomalies for each combination of a country and a KPI. The processor can pick the KPIs after analyzing the correlation of the performance degradation with the KPIs generated in call detail records (CDR). The KPIs can include call duration such as minutes of usage, answered call ratio, error codes such as call termination codes, call attempts, number of calls, call drop rate, signal strength, or any combination thereof. For example, KPIs can be calculated based on the following CDR fields:

NER-Formula: ((call_answered+user_busy+unallocated_number+ring_no_answer+rejected)/call_attempts)*100,
ASR—Formula: (call_answered/call_attempts)*100,
lo_calling_mos,
short_calls,
avg_pdd (average post dial delay)—Formula: pdd_sum/call_attempts,
long_pdd (long PDD calls count),
bad_request_400,
forbidden_403,
not_found_404,
temporarily_unavailable_480,
too_many_hops_483, address_incomplete_484,
request_terminated_487,
service_unavailable_503,
request_timeout_408,
server_internal_error_500,
nonexistant_call_transaction_481,
not_acceptable_488,
server_timeout_504

In some embodiments, the minutes of usage and call attempts can be the main KPIs used in creating the ranked list of the most important issues. The error codes, such as 4XX and 5XX, provide insights on how the call terminated. In total, the processor can consider six or seven error codes among the KPI error codes.

Figure 2A:
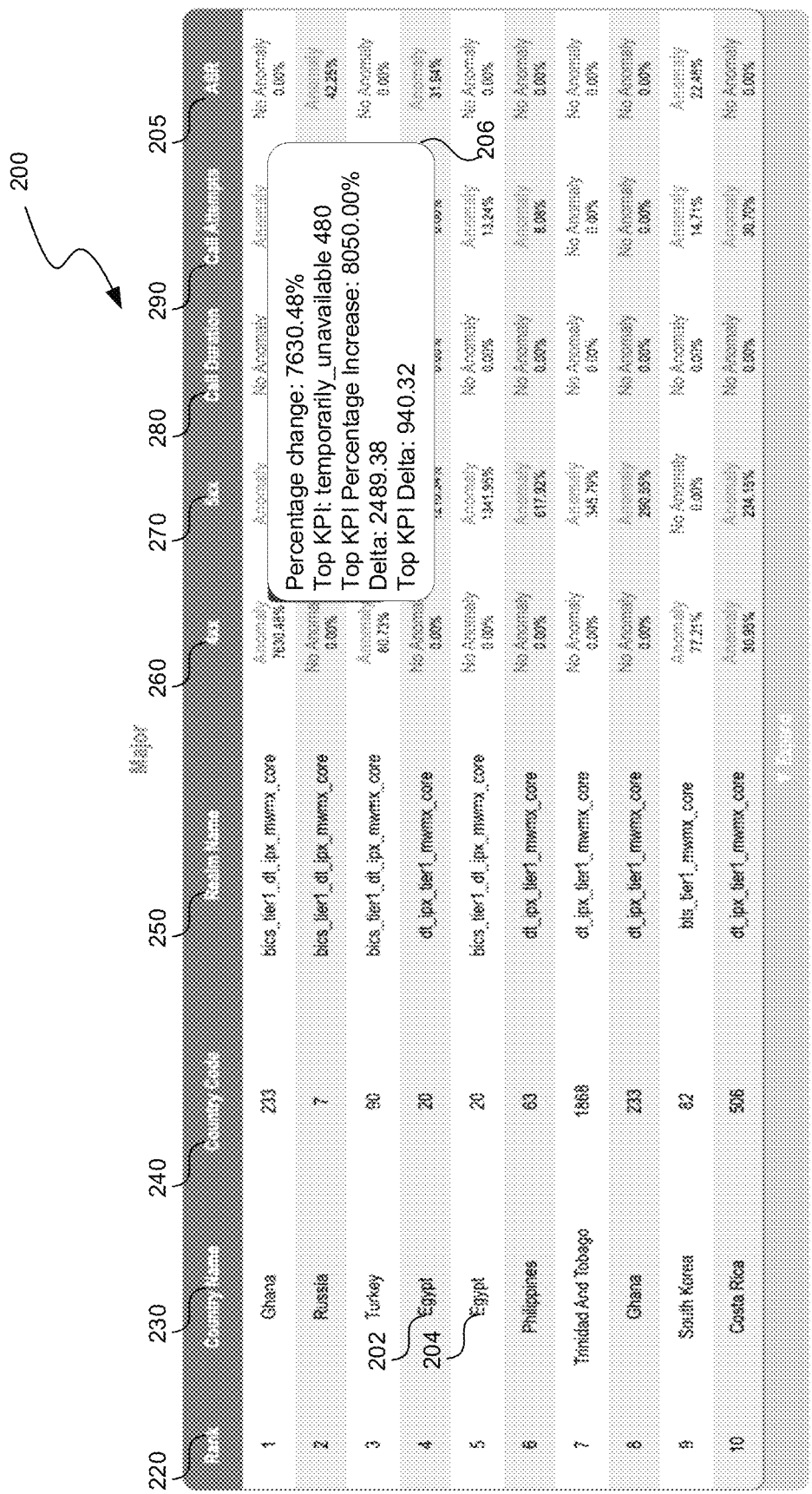
FIGS. 2A-2B show the major and minor categories, and the ranking of various countries within those categories.
Figure 2B:
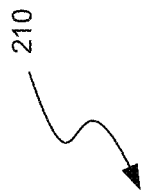

For each of the combinations of the country and the KPIs, the processor knows the category they belong to, e.g. a minor or major category. For the combinations where anomalies are detected, the processor can compute the delta and delta percentage, where delta is the difference between the actual values and the predicted boundaries ranges. The processor combines strongly correlated error codes to form 4xx and 5xx error code category. For example, the below logic can be used to classify combinations of the country and the KPIs into an error code:

when (kpi_id like '% short_calls' or kpi_id like '% long_pdd' or kpi_id like '% avg_pdd') then 'callvolume', where pdd stands for Post Dial Delay. PDD is the time or delay that occurs from the time a number has been dialed until the caller or called party hears ringing.

when (kpi_id like '% service_unavailable_503' or kpi_id like '% server_internal_error_500' or kpi_id like '% server_timeout_504') then '5xx' when (kpi_id like '% bad_request_400' or kpi_id like '% forbidden_403' or kpi_id like '% not_found_404' or kpi_id like '% temporarily_unavailable_480' or kpi_id like '% too_many_hops_483' or kpi_id like '% address_incomplete_484' or kpi_id like '% request_terminated_487' or kpi_id like '% request_timeout_408' or kpi_id like '% nonexistant_call_transaction_481' or kpi_id like '% not_acceptable_488') then '4xx' end as category The processor monitors calls made to over 200 countries around the world for additional information such as country name, country code, or realm name. Realm name can be the carrier supporting the call. A single international call can be supported by multiple carriers. For example, the user in the United States can be a wireless telecommunication network user initiating the call on a wireless telecommunication network in the United States. The user can place a call to Russia with the aid of multiple international carriers. In addition, two different calls placed from the United States to Russia, which are initiated by the same wireless telecommunication network in the United States, can use different international carriers. Therefore, as seen in FIGS. 2A-2B, each international call contains additional information such as destination country name and realm name.

To detect anomalies, the processor uses a machine learning model that, based on historical trends, determines whether the value of a KPI for a particular country falls within the expected boundaries and if the value of the KPI does not fall within the expected boundaries, the processor flags the KPI as an anomaly. To detect anomalies, there are hundreds of thousands of combinations of all relevant KPIs, and it is difficult to isolate the particular KPI or combinations of KPIs that indicate the anomaly. The machine learning model can perform the analysis and focus on the relevant KPI or a combination of relevant KPIs.

To perform the analysis, the processor obtains historical data about various values of KPIs for a particular country. The machine learning model analyzes the historical data to determine the regular trend, the noise in the data, and the seasonality. Seasonality is a characteristic of a time series in which the data experiences regular and predictable changes that recur over a predetermined period of time, such as every calendar year. Any predictable fluctuation or pattern that recurs or repeats over the predetermined period of time is said to be seasonal. Based on the regular trend, the noise in the data, and the seasonality, the machine learning mod& can predict normal boundaries for the KPI, such as lower and upper boundaries. The process is further described in FIG. 1B. The machine learning mod& is further explained in the U.S. patent application Ser. No. 16/539,490, and incorporated herein by this reference in its entirety.

When the machine learning model receives a new KPI, the machine learning model analyzes whether the KPI value is within the boundary or not. When the KPI value is outside of the boundary, the machine learning model can flag that KPI as an anomaly. The machine learning model is different from the prior art because it is not trained using labels, and the boundaries and predictions are dynamic. For example, a KPI can increase dramatically, such as the call volume increases from 50 million to 100 million. Initially, the machine learning model keeps flagging the KPI indicating the number of calls as an anomaly until the machine learning model incorporates the new call volume into the historical data and adjusts the upper and lower boundaries. As a result, the machine learning model can stop flagging the KPI indicating the number of calls as an anomaly. The machine learning model can adjust the boundaries automatically, without receiving any user input. The machine learning model can notify others of the anomaly using SMS, email alert notification, etc.

In some embodiments in block 120, the processor can analyze the output of the machine learning model, namely the KPIs tagged as an anomaly, and the predicted range including the lower and upper bounds. Based on the analysis, the processor can compute the percentage deviation of the actual value from the predicted range. In another embodiment in block 120, the machine learning model in block 110 can only output one or more KPIs that are tagged as an anomaly. Subsequently, a second machine learning model in block 120 can compute the upper and lower boundaries for the KPI for the particular country based on the historical data.

In block 130, the processor can classify the anomalies into good or bad anomalies. For example, if the percentage deviation from the predicted range is in a positive direction, such as fewer dropped calls, or a higher call volume, the anomaly can be classified as good. However, if the percentage deviation from the predicted range is in a negative direction, such as a higher call drop rate, or a lower signal strength, the anomaly can be classified as bad.

Positive direction can be higher than predicted upper boundary, or can be lower than predicted lower boundary. For example, for a few KPIs when the actual value is higher than the predicted upper boundary the anomaly is a bad anomaly, and when the actual value is lower than the predicted lower boundary than the anomaly is a bad anomaly. In more specific examples, when the ASR value is less than predicted lower boundary, then the anomaly is bad. When the NER value is less than predicted lower boundary, then the anomaly is bad. For all other KPI values, when the value is higher than predicted upper boundary then the anomaly is bad.

In block 140, the processor applies weights to important KPI and ranks the countries. For example, the KPIs can be weighed based on the severity of the error code. The processor can categorize the error codes into individual buckets and give each bucket a specific weight used in the ranking. The weight the KPI receives is the weight of the error code associated with the KPI. A 5XX error code can be ranked higher in severity than a 4XX error code, and consequently, a KPI associated with a 5XX error code can receive a higher ranking weight than a KPI associated with a 4XX error code. Based on the below formula, the processor can compute the weights for each of the combinations of country and KPI:

$$((60*(nvl(asr\_lowerbound\_percentage,0)))+(7*(nvl \\ (4xx\_upperbound\_percentage,0)))+(7*(nvl \\ (5xx\_upperbound\_percentage,0)))+(3*(nvl(call- \\ volume\_upperbound\_percentage,0)))+(nvl \\ (call\_attempt\_upperbound\_percentage,0)))$$

NVL replaces null (returned as a blank) with a string in the results of a query. If expr1 is null, then NVL returns expr2. In the above formula, if any of the variables asr_lowerbound_percentage, 4xx_upperbound_percentage, 5xx_upperbound_percentage, callvolume_upperbound_percentage, call_attempt_upperbound_percentage are not defined, NVL returns 0. In the above formula, upperbound_percentage or lowerbound_percentage are those values that are computed using the actual value and the predicted boundary for any KPI combination. Specifically, $$Upperbound\_percentage = ((value\text{-}upperbound)/upperbound)*100$$

$$Lowerbound\_percentage = ((lowerbound\text{-}value)/lowerbound)*100$$

For example, asr_lowerbound_percentage uses the lowerbound_percentge formula above with lower bound and value particular to the ASR KPI. Similarly, 4xx_upperbound_percentage uses the upperbound_percentage formula above with upper bound and value particular to the 4xx KPI.

In block 150, the processor can receive additional input about how to weigh the important KPIs besides the error codes. For example, the processor can receive input from a user indicating which KPIs are most important, such as minutes of usage and call attempts. For each category (e.g. major/minor) the processor can order the combinations of country plus KPIs based on descending order of the weights calculated above and rank the country plus KPI. For example, as seen in FIG. 2A, a single country, namely Egypt, can appear twice in table 200, in entries 202 and 204, because a different carrier, e.g., the realm name, is supporting the call to Egypt in the two different entries 202, 204. As can be seen in FIG. 2A, the different carriers have different KPI anomalies.

After the final ranking, for each category, the processor can display the countries with the worst performance degradation in international calling. Also, the processor can pinpoint the most impactful error code.

Figure 1B:
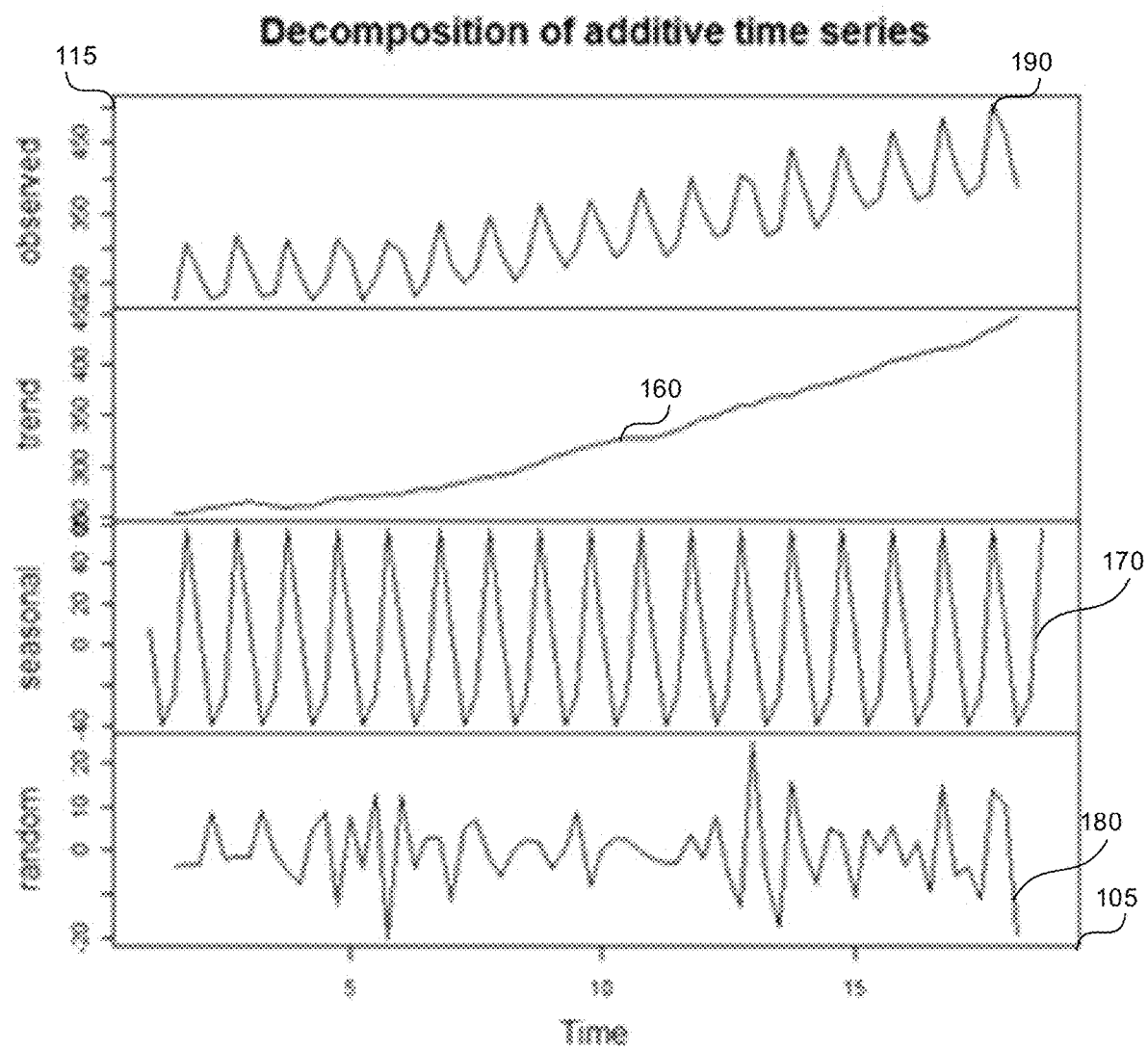
FIG. 1B shows a workflow of the anomaly detection model.

FIG. 1B shows a workflow of the anomaly detection model. A processor can collect the historical time series data 190 for a predetermined period of time, such as at least two weeks and at most 8 weeks long, for each KPI. The X-axis 105 indicates time, while the Y-axis 115 indicates the value of a particular KPI represented by the historical time series data 190. The processor can decompose the data into three components: the trend 160, which reflects the long-term progression of the series, the seasonality 170, and the random (or "noise") 180, which describes random, irregular influences.

The processor can use polynomial regression to estimate decomposed components 160, 170, 180, and to predict a future value of the decomposed components 160, 170, 180 for a new date. For example, the processor can use the seasonality 170 of the historical data to predict the seasonality value of the data for the new date.

The processor can calculate the mean and standard deviation of the noise 180 to indicate the variance of the historical data 190. Based on the variance of the historical data 190, the processor can determine the thresholds of the upper and lower boundaries of a normal range for a given KPI for a new date. The larger the variance of the historical data 190, the wider the upper/lower boundary, and vice versa.

When more than 80% of the predetermined period of time, e.g. more than 11 days in a two week period, is marked as abnormal, the processor can recalculate and get the new trend and new seasonality based on these two weeks' data. The reason the processor recalculates the trend in the seasonality is that when more than 80% of the predetermined period of time data is marked as abnormal, that's an indication that the trend and seasonality of the data have changed.

FIGS. 2A-2B show the major and minor categories, and the ranking of various countries within those categories. The processor, apart from alerting the wireless telecommunication network for the anomalies detected, can produce an intelligently summarized report 200, 210 explaining what caused the issue and where to focus to resolve and improve the wireless telecommunication network performance and customer experience.

The major category table 200 shows countries receiving more than 5,000 call attempts a day, while the minor category table 210 shows the countries receiving 5,000 or fewer call attempts a day. In addition to ranking 220, 225, the categories include information about country name 230, 235, country code 240, 245, realm name or carrier name 250, 255, and the KPIs used in the ranking such as 4XX error codes 260, 265, 5XX error codes 270, 275, call duration 280, 285, call attempts 290, 295, and answer-seizure ratio (ASR) 205, 215. The ASR is the percentage of telephone calls that are answered, a measure of network quality and call success rates in telecommunications.

As can be seen in the major category table 200, a single country can show up multiple times in the ranking, e.g. entries 202, 204, because carriers for the international call are different. The processor can separately monitor the KPIs for each country, for each carrier, and, if the country has multiple codes, for each country code. A single country can have multiple anomalies in various KPIs as seen in FIGS. 2A-2B.

When the user selects an entry in the categories 200, 210, the processor can provide additional information shown in element 206 including the percentage change, and the top error code that contributed to that percentage change, specifically, error code temporarily unavailable 480. Percentage change is the deviation of the actual value compared to the predicted lower or upper bound values. Considering upper or lower boundary as the maximum change allowed, any delta or percentage change is computed keeping the boundary values as base. Top KPI Delta, namely the temporarily unavailable error code, indicates the difference between the actual value of the top KPI and the predicted boundary range for the top KPI.

Figure 2C:
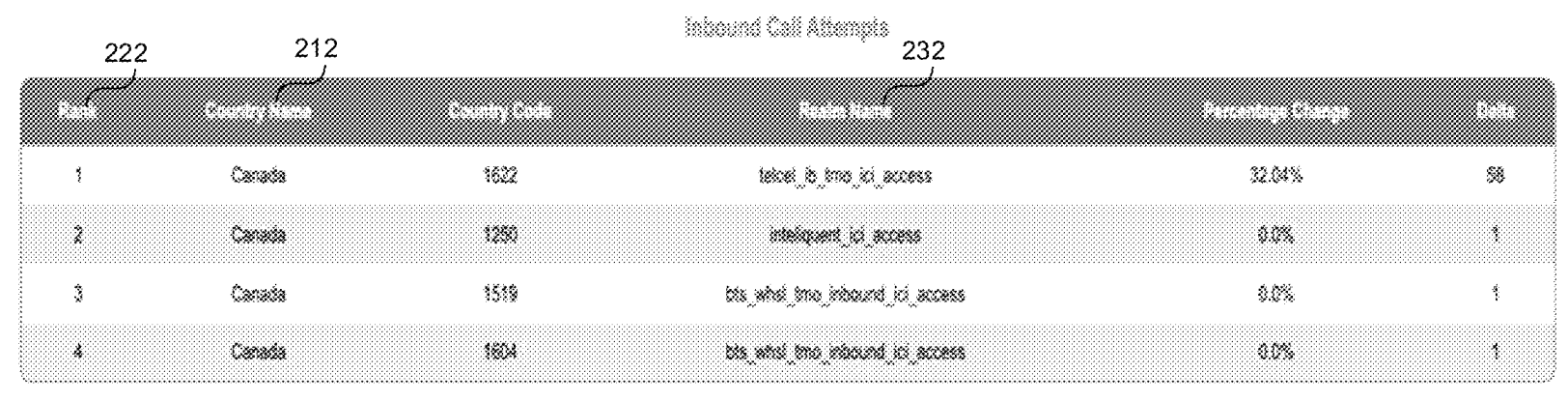

FIG. 2C shows a ranking of inbound call attempts. For example, the wireless telecommunication network can request to track the change in the inbound call attempts from a few specific realm name 232. The processor can perform the anomaly monitoring on the inbound call attempts KPI for each country 212, e.g. Canada in FIG. 2C.

For the KPI and KPI combinations where anomalies were detected, the processor can compute the difference, e.g. delta, between the actual values and the predicted boundary range. Ordering the delta in the descending order, the processor can rank the combinations, as shown in column 222, and show them in tabular form.

Figure 3:
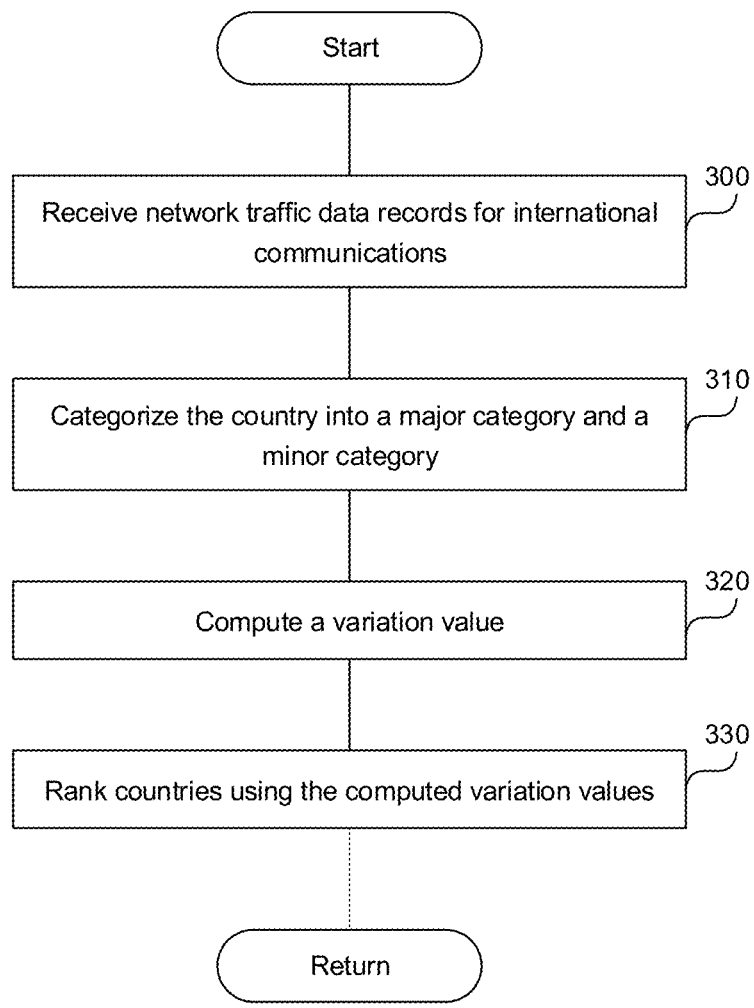
FIG. 3 is a flowchart of a method to identify international calling performance issues.

FIG. 3 is a flowchart of a method to identify international calling performance issues. In block 300, a hardware or software processor executing instructions describing this application can receive network traffic data records for international communications. The network traffic data records can be CDR from a telecommunication network involved in international communication. The network traffic data records can include information about communication attempts associated with the country, and a country identifier indicating the country. International communication can include a video call, voice call, text message, etc. The network traffic data records can further include information about call duration, answered call ratio, call termination code, or any combination thereof.

The CDR can focus on international communications originating in a particular country, such as the U.S.A. The processor can aggregate the communication attempts and communication duration at various granularities such as country, country code, realm name, error code.

In block 310, the processor can categorize the country into a major category and a minor category based on the communication attempts information in the received network traffic data records. For example, the processor can categorize the country into the major category when the country receives more than a predetermined threshold call attempts per day, and into the minor category when the country receives less than the predetermined call attempts per day. The predetermined threshold can be 5,000 calls. The predetermined threshold is subject to change based on the traffic increase and customer base of the wireless telecommunication network.

In block 320, the processor can iterate through at least a subset of country identifiers associated with the categorized network traffic data records. In addition, the processor can iterate through each KPI in a subset of selected KPIs. The selected KPIs can include error code, call duration, call attempts, answered call rate, call drop rate, signal strength, or any combination thereof. While iterating through the subset of country identifiers and the KPIs, the processor can monitor performance using an anomaly detection model to identify an anomaly in network performance. The processor can determine an actual value associated with the KPI for the detected anomaly. The processor can compute a variation value of the determined actual value associated with the KPI based on a predicted range of values associated with the KPI.

Using the computed variation, the processor can classify the detected anomaly as a good anomaly or a bad anomaly. For example, a good anomaly indicates an unexpected improvement in performance, while a bad anomaly indicates an unexpected degradation in performance.

In block 330, the processor can rank countries associated with the subset of country identifiers using the computed variation values. To rank the countries, the processor can create a group including the country and/or a unique carrier associated with a communication attempt to the country. The groups can be based on the carrier at global level, country on the whole excluding the carrier, or both country and the unique carrier. The processor can rank the group using the computed variation values.

To rank the countries, the processor can apply a weight to a KPI associated with the group, compute a sum of the weighted KPIs for each group, and rank the group according to the sum of the weighted KPIs.

Computer System

Figure 4:
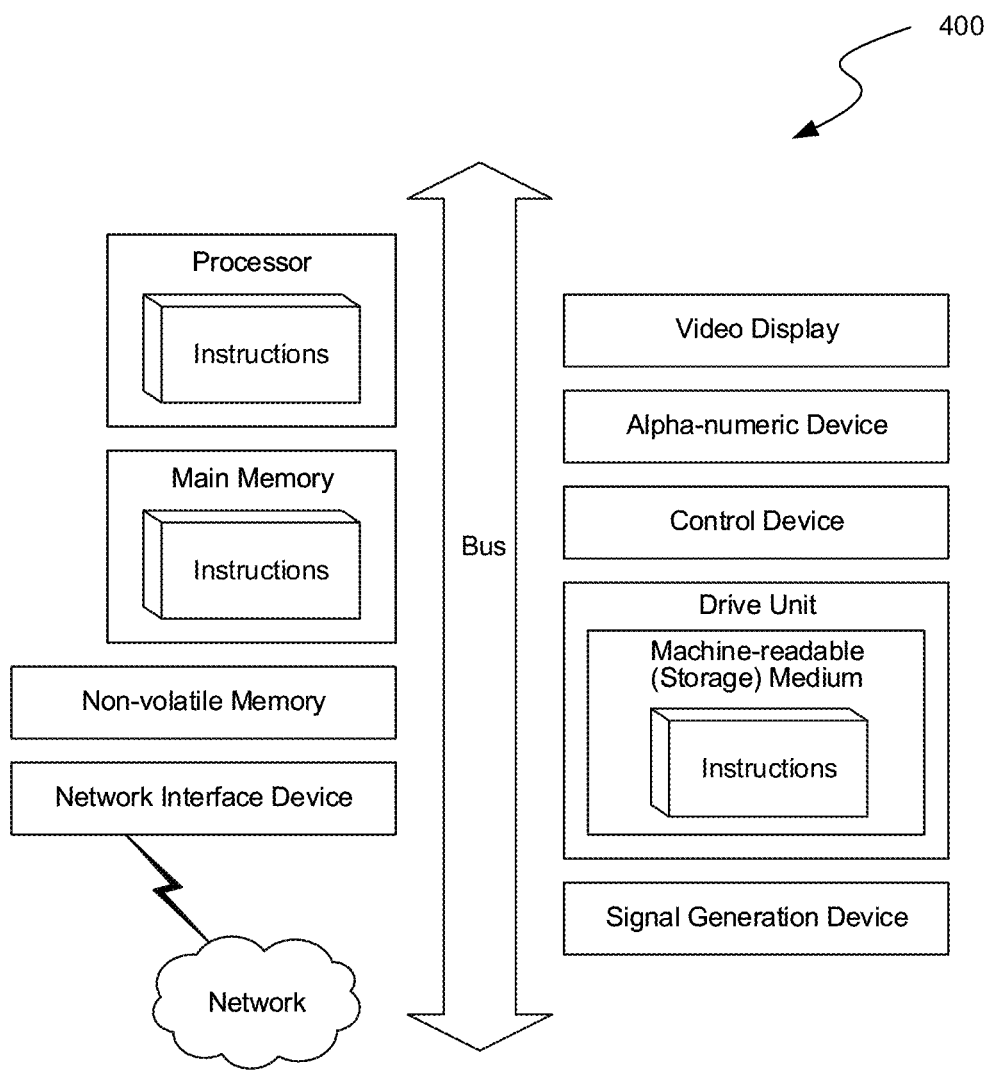
FIG. 4 is a diagrammatic representation of a machine in the example form of a computer system within which a set of instructions, for causing the machine to perform any one or more of the methodologies or modules discussed herein, can be executed.

FIG. 4 is a diagrammatic representation of a machine in the example form of a computer system 400 within which a set of instructions, for causing the machine to perform any one or more of the methodologies or modules discussed herein, can be executed.

In the example of FIG. 4, the computer system 400 includes a processor, memory, non-volatile memory, and an interface device. Various common components (e.g., cache memory) are omitted for illustrative simplicity. The computer system 400 is intended to illustrate a hardware device on which any of the components described in the example of FIGS. 1-3 (and any other components described in this specification) can be implemented. The computer system 400 can be of any applicable known or convenient type. The components of the computer system 400 can be coupled together via a bus or through some other known or convenient device.

The processor of the computer system 400 can execute instructions described in this application, for example, the instructions described in FIG. 3. The processor of the computer system 400 can execute the machine learning model, as described in this application. The main memory, the nonvolatile memory, and/or the drive unit of the computer system 400 can store the instructions executed by the processor.

This disclosure contemplates the computer system 400 taking any suitable physical form. As example and not by way of limitation, computer system 400 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 can include one or more computer systems 400; be unitary or distributed; span multiple locations; span multiple machines; or reside in a cloud, which can include one or more cloud components in one or more networks. Where appropriate, one or more computer systems 400 can perform without substantial spatial or temporal limitation one or more steps of one or more methods described or illustrated herein. As an example and not by way of limitation, one or more computer systems 400 can perform in real time or in batch mode one or more steps of one or more methods described or illustrated herein. One or more computer systems 400 can perform at different times or at different locations one or more steps of one or more methods described or illustrated herein, where appropriate.

Software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A system comprising:
   one or more processors;
   at least one memory coupled to the one or more processors, wherein the at least one memory includes instructions executable by the one or more processors to:
   receive, from server computers coupled to one or more wireless telecommunication networks, network traffic data records for international communications,
   wherein the network traffic data records include country identifiers indicating countries associated with the international communications;
   for at least a set of the country identifiers associated with the network traffic data records for the international communications:
   for each key performance indicator (KPI) in a set of selected key performance indicators (KPIs):
   monitoring performance using an anomaly detection model to identify an anomaly in network performance;
   determining an actual value associated with the KPI for the detected anomaly; and
   computing a variation value of the determined actual value associated with the KPI based on a predicted range of values associated with the KPI; and,
   ranking countries associated with the set of country identifiers using the computed variation values, to thereby troubleshoot network performance issues related to international long-distance calling, text messaging, and data communications over the one or more wireless telecommunication networks.

2. The system of claim 1, wherein the instructions to rank countries further comprises the instructions to:
   create one or more groups of the network traffic data records including the country and/or a unique carrier associated with a communication attempt to the country; and
   rank the one or more groups including the country and/or the unique carrier using the computed variation values.

3. The system of claim 1, wherein the network traffic data records further comprise information about: call duration, answered call ratio, call termination code, or any combination thereof.

4. The system of claim 1, wherein the KPIs comprise: error code, call duration, call attempts, answered call rate, call drop rate, signal strength, or any combination thereof.

5. The system of claim 1, further comprising instructions to categorize each country into a major category and a minor category, including instructions to:
   categorize the country into the major category when the country receives more than a predetermined threshold call attempts per day; and
   categorize the country into the minor category when the country receives less than the predetermined threshold call attempts per day.

6. The system of claim 1, wherein the instructions for ranking countries further comprises instructions to:
   apply a weight to the KPI associated with one or more groups of the network traffic data records including the country and/or a unique carrier;
   compute a sum of the weighted KPIs for each of the one or more groups including the country and/or the unique carrier; and
   rank the one or more groups including the country and/or the unique carrier according to the sum of the weighted KPIs.

7. At least one computer-readable medium, excluding transitory signals and carrying instructions, which when executed by at least one data processor, performs operations, comprising:
   receive network traffic data records for the international communications;
   for a set of the network traffic data records for the international communications, wherein the set of network traffic data records have country identifiers associated therewith:
   for each key performance indicator (KPI) in a set of selected key performance indicators (KPIs):
   monitoring network performance using an anomaly detection model to identify an anomaly in the network performance;
   determining an actual value associated with the KPI for the detected anomaly; and
   computing a variation value of the determined actual value associated with the KPI based on a predicted range of values associated with the KPI; and
   ranking countries associated with the country identifiers using the computed variation values.

8. The at least one computer-readable medium of claim 7, wherein the international communications comprise a call or a text message.

9. The at least one computer-readable medium of claim 7, wherein the operations further comprise categorizing the country identifiers related to the network traffic data records based on information of multiple communication attempts.

10. The at least one computer-readable medium of claim 7, wherein the ranking further comprises:
creating one or more groups of the network traffic data records including the country or a unique carrier associated with a communication attempt to the country; and
ranking the one or more groups using the computed variation values.

11. The at least one computer-readable medium of claim 7, wherein the network traffic data records further comprise information about: call duration, answered call ratio, call termination code, or any combination thereof.

12. The at least one computer-readable medium of claim 7, wherein the operations further comprise: using the computed variation, classifying the detected anomaly as a good anomaly or a bad anomaly.

13. The at least one computer-readable medium of claim 7, wherein the KPIs comprise: error code, call duration, call attempts, answered call rate, call drop rate, signal strength, or any combination thereof.

14. The at least one computer-readable medium of claim 7, further comprising:
categorizing each country into a major category and a minor category, including:
categorizing the country into the major category when the country receives more than a predetermined threshold communication attempts per day; and
categorizing the country into the minor category when the country receives less than the predetermined threshold communication attempts per day.

15. The at least one computer-readable medium of claim 7, wherein the ranking further comprises:
applying a weight to a KPI associated with one or more groups of the network traffic data records including the country or a unique carrier;
computing a sum of the weighted KPIs for the one or more groups; and
ranking the one or more groups according to the sum of the weighted KPIs.

16. At least one non-transitory, computer-readable medium, carrying instructions, which when executed by a processor, perform operations, comprising:
troubleshooting network performance issues related to international long-distance calling, text messaging, and data communicating over at least one wireless telecommunication network by:
receiving data records for the international long-distance calling, text messaging, and data communicating over the wireless telecommunication network, wherein the data records reflect network operations in multiple countries;
monitoring performance using an anomaly detection model for combinations of a country and a key performance indicator (KPI) based on the data records;
analyzing an output of the model to compute deviations of an actual measured value from a predicted range;
based on the KPI, classifying the detected anomalies into multiple grades; and,
computing a weighted ranking of the multiple countries based on the detected anomalies.

17. The at least one non-transitory, computer-readable medium of claim 16, further comprising:
categorizing the multiple countries into a major category and a minor category based on a number of call attempts; and
using the weighted ranking to identify insights into each of the categories to provide guidance for network troubleshooting, to thereby provide engineers guidance on identifying where issues with the international long-distance calling arise so that the issues are resolved.

18. The at least one non-transitory, computer-readable medium of claim 16, further comprising categorizing the multiple countries into a major category and a minor category based on a number of call attempts.

19. The at least one non-transitory, computer-readable medium of claim 16, further comprising employing the weight-based ranking of the multiple countries on anomalous data to isolate at least one network performance degradation of the international long-distance calling, text messaging, or data communicating.

* * * * *